Jan. 10, 1956

R. E. HALL 2,730,207

COLLAPSIBLE TOWER AND HOIST

Filed Nov. 28, 1952

Robert E. Hall
INVENTOR.

Jan. 10, 1956
R. E. HALL
2,730,207
COLLAPSIBLE TOWER AND HOIST
Filed Nov. 28, 1952
2 Sheets-Sheet 2
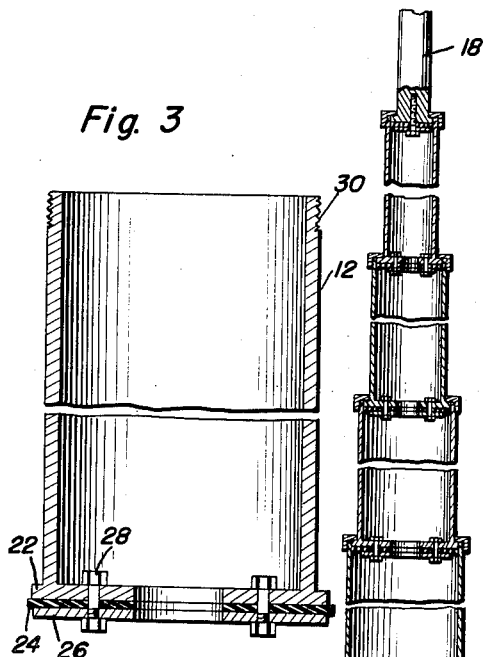
Fig. 2
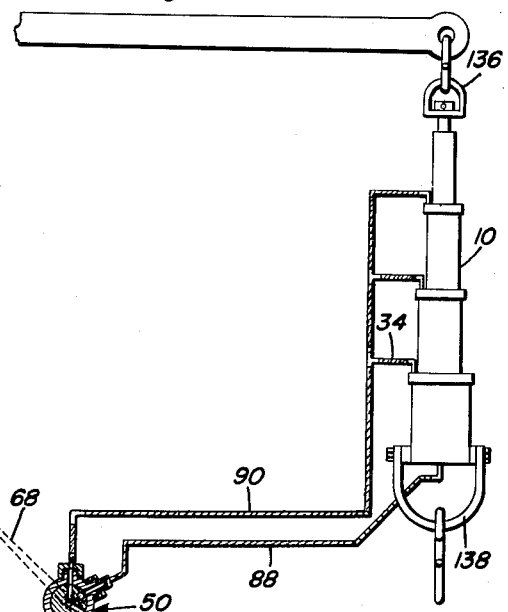
Fig. 10
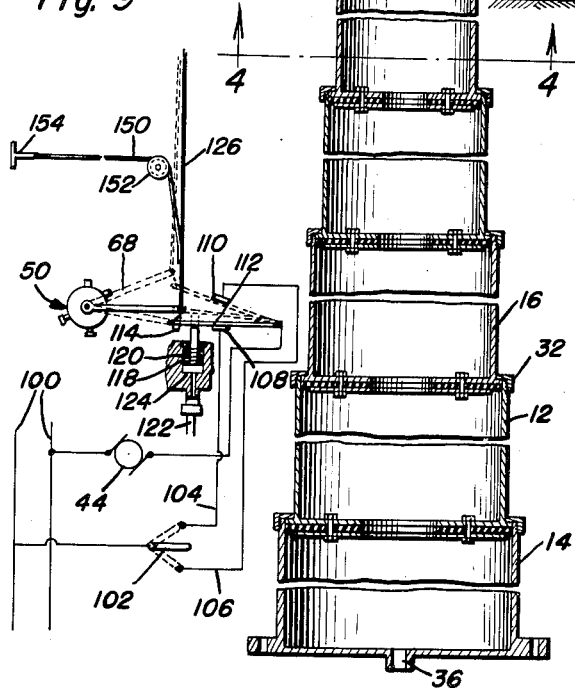
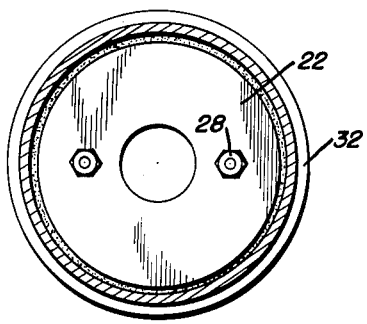
Fig. 4
Robert E. Hall
INVENTOR.
BY *Clarence A. O'Brien*
*and Harvey B. Jacobson*
Attorneys United States Patent Office 2,730,207
Patented Jan. 10, 1956

2,730,207
COLLAPSIBLE TOWER AND HOIST
Robert E. Hall, Larkinsville, Ala.

Application November 28, 1952, Serial No. 323,013

7 Claims. (Cl. 189—14)

This invention relates to a collapsible tower and hoist and particularly to a fluid telescoping tower with automatic means for lowering and raising the tower in response to wind or other weather conditions.

In the operation of towers of the telescoping variety it is frequently desirable to telescope the tower and remove it from the force of gales or other weather conditions. It is further desirable to have such retrieving operation performed automatically so that the tower will be retrieved even in the absence of the operator. Also it is desirable to use telescoping fluid driven devices for lifting, pushing or otherwise controlling various loads.

The present invention relates to a telescoping tower which may be used for many purposes such as lifting or elevating loads, pushing or pulling various items and particularly for mounting a radio aerial which may be projected to a considerable height and retrieved in the event of inclement weather, particularly gales.

It is further desirable to provide the device with automatic switching arrangement so that a manual switch may be operated to raise the tower and after the tower has been raised the tower will automatically shut itself off after which the manual switch may be adjusted to lowering so that in the event of a disturbance such that the tower should be lowered, the tower will automatically be lowered in the absence of the operator.

It is accordingly an object of the invention to provide an improved telescopic tower.

It is a further object of the invention to provide a telescoping tower which will both open and close under power.

It is a further object of the invention to provide a telescoping tower in which the individual sections are double-acting pistons operative to either expand or collapse the tower.

It is a further object of the invention to provide an automatic wind responsive device for causing lowering of the tower.

It is a further object of the invention to provide an improved valve for controlling a collapsible tower.

It is a further object of the invention to provide a combination valve and switch operative in response to wind conditions.

Other objects and many of the attendant advantages of the present invention will be apparent from the following detailed description taken in conjunction with the accompanying drawings, in which:

Figure 2 is a sectional elevation of the tower;

Figure 3 is a vertical section of a tower element combining both the piston and cylinder;

Figure 4 is a cross-section through the tower taken substantially on the plane indicated by the line 4—4 of Figure 2;

Figure 5 is a schematic illustration of the control system with the control valve shown in cross-section substantially on the plane indicated by the line 5—5 of Figure 6;

Figure 6 is an elevation of the control valve;

Figure 7 is an end view of the control valve;

Figure 8 is an elevation partially in section of the valve core;

Figure 9 is a schematic view of the pump control for the tower; and

Figure 10 is an elevation partially in section of the tower used as a hoist.

Figure 1:
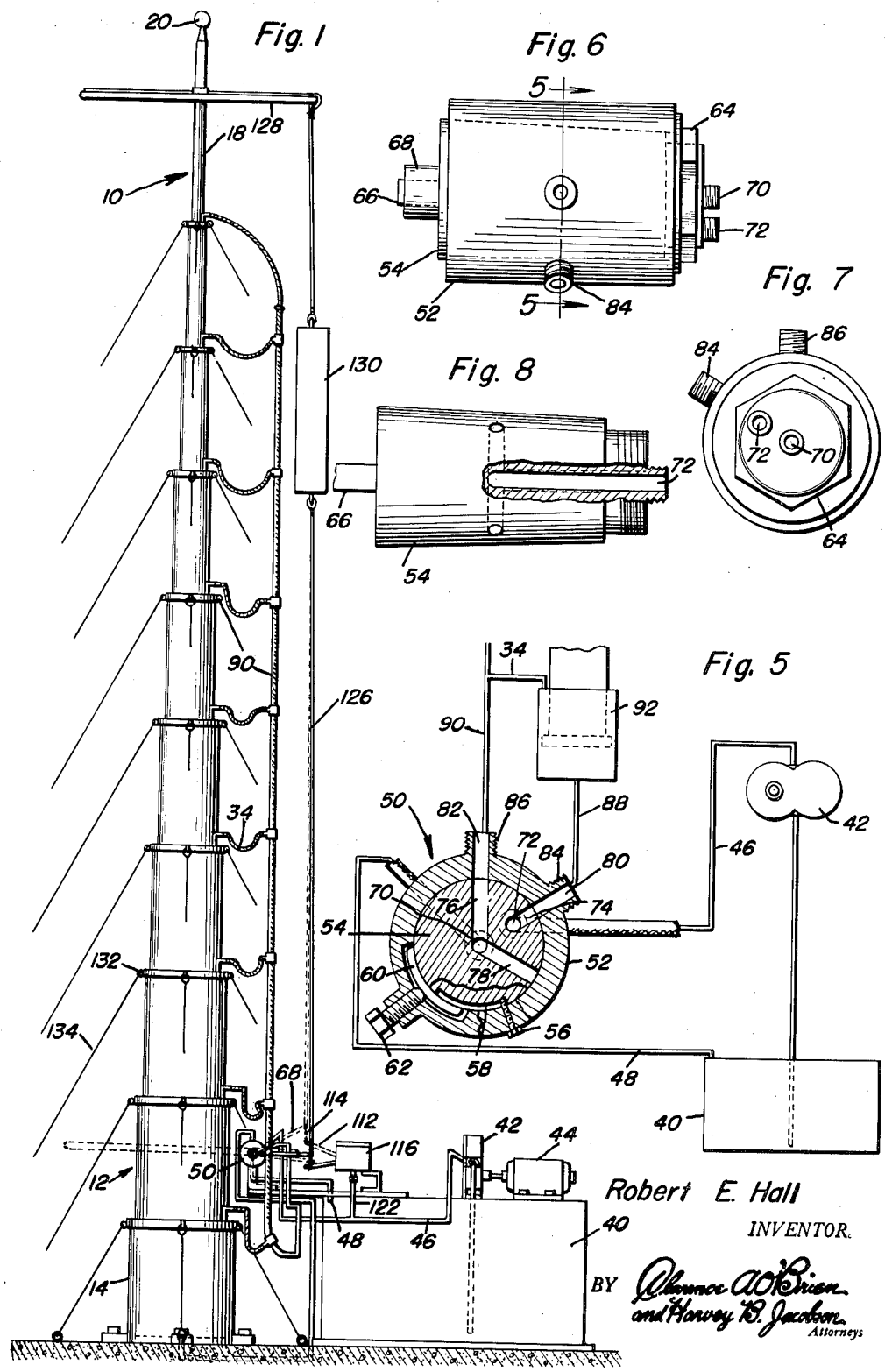
Figure 1 is a front elevation of the collapsible tower in extended relation.

In an exemplary embodiment, the telescopic tower 10 is divided into a plurality of sections 12 each of which constitutes a cylindrical element serving both as a piston and as a cylinder for an adjacent section. A larger section is called the base section and a smaller section 18 is called the top section for convenience of nomenclature. However, it will be apparent that the sections may be numbered in any order and the tower may be utilized in any position. Starting with the base section each section is a combination cylinder and piston until the top section 18 is reached which becomes merely a piston. Each of the pistons is of the double acting type so that it may be either retracted or extended as may be desired.

In the modification according to Figure 1, the tower has been shown erected as a radio antenna tower for elevating an antenna 20 to a predetermined distance above the ground, while according to Figure 10 the device is being utilized as a hoist or lift as the case may be.

Each of the sections such as the cylinder 12 is provided with a laterally directed annular base portion 22 on which is mounted a packing 24 held in place by means of an annular ring 26 which is secured to the base 22 by means of suitable fasteners such as the bolts 28. The base 22 and the packing 24 provides a sliding seal within the base cylinder 14 so that the section 12 may slide up and down in the cylinder 14. The top end of the section 12 is provided with a screw-threaded portion 30 for receiving a cap ring 32 which extends inwardly and is provided with a packing similar to the packing 24 to provide a sliding seal fit with the exterior surface of the next adjacent inward cylinder such as the cylinder 16.

Any desired number of concentric cylinders may be utilized and each of the cylinders will then provide a cylindrical space between the cap 32 of one cylinder and its own base and seal 22 and 24 so that fluid may be introduced into the space between the cylinders by means of suitable connections 34 while fluid may be introduced into the interior of the tower by means of a suitable connection 36.

A fluid reservoir 40 is provided preferably in proximity to the tower 10 and a pump 42 is provided in communication with the reservoir 40 where the motor 44 is operatively connected to the pump 42 so that operation of the motor 44 will drive the pump 42 to supply pressure through a supply line 46. The return line 48 will return fluid to the reservoir 40 as may be desired. The control valve generally indicated at 50 is provided with an external cylindrical casing 52 and a rotating inner core 54. A stop pin 56 is mounted in the casing 52 and extends into a groove 58 in the core 54 for limiting the angular rotation of the core 54 with respect to the casing 52. A brake shoe 60 is controlled by means of a pressure screw 62 to apply braking pressure to the core 54 to control the pressure necessary to rotate the core 54 in the casing 52. A nut 64 is applied to one end of the core 54 to retain it in the casing 52 and preferably the core 54 is somewhat tapered so that it may be drawn into firm sealing contact with the inner walls of the cylinder 52 by means of the nut 64. An operating shank 66 extends outwardly from the opposite end of the core 54 so that an operating crank 68 may be readily attached in operative relation to the core 54. The core 54 is provided with a plurality of longitudinally extending bores 72 and 70 which are connected respectively to the pressure line 46 and the return line 48. One of the longitudinal bores, such as the bore 72 is provided with a laterally extending bore 74 which extends to the outer surface of the core 54 so that it opens to the inner wall of the casing 52. The other longitudinal bore such as 70 is provided with a plurality of laterally extending bores 76 and 78 which also extend to the surface of the core 54 and preferably on opposite sides of the bore 74 and spaced equal distances therefrom. The casing 52 is provided with a pair of apertures 80 and 82 which open into the inner wall of the casing 52 and are provided with suitable connections 84 and 86 to which is connected a conduit 88 extending to the interior of the cylindrical members and a conduit 90 extending to the spaces between the cylindrical members. The branch conduits 34 are connected into the conduit 90 so that the conduit 90 supplies fluid to all of the spaces between the cylinders. It will be apparent from looking at the drawings that when the core is moved to the position shown in Figure 5 the pressure conduit 46 will be connected through the longitudinal bore 72 through the lateral bore 74 and the aperture 80 to the conduit 88 and into the interior surface of the cylinders forming the tower. Likewise the spaces 92 between the cylinders will be connected through the branch conduits 34 into the conduit 90 into the aperture 82 and the lateral bore 76 to the bore 70 and into the return line 48. Also it will be apparent that by reversing the connection the conduit 88 will be connected through the bore 78 to the return conduit 48 while the pressure conduit 46 will be connected through the longitudinal bore 72 and the aperture 82 to the conduit 90.

The control system for the motor 44 controls the supply line 100 for supplying alternating current to the motor 44. The control switch 102 is manually controlled and may be connected to either one of two conductors 104 and 106. The conductor 104 is connected to a terminal 108 while the conductor 106 is connected to a spaced terminal 110 of a special switch presently to be described. The valve 50 is arranged with the operating handle 68 overlying a switch actuating lever 112 connected thereto by means of a lost motion device such as a chain 114. The contacts 108 and 110 are enclosed in a suitable operating box 116 in which is mounted a piston 118 which is biased to inoperative position by means of a spring 120. A conduit 122 supplies fluid from the pressure line 46 into the cylinder 124 behind the piston 118. A tension line such as a cable 126 is connected to the handle 68 and the opposite end thereof is connected to a handle or arm 128 extending laterally from the tower 10 and preferably is of an annular nature supported on suitable spokes, not shown. A sail 130 is connected intermediate the ends of the cable 126 so that when there is sufficient wind supplied thereto it will apply tension to the arm 68.

In the operation of the device, the switch 102 will be swung to the position to connect the conductor 104 to the contact 108 and the switch actuating member 112 will be pressed downward by means of the handle 68 which in that position will connect the conduit 46 through the longitudinal bore 72, the lateral bore 74 and the aperture 80 to the conduit 88 connected to the innermost cylinders of the device. The closing of the switch 102 will cause the motor 44 to drive the pump 42 and apply pressure through the conduits above mentioned into the interior of the cylinders to cause extension of the tower. Simultaneously, the valve 50 will connect the spaces between the cylinders through the conduit 90, the aperture 82, the bore 76 and the bore 70 to return conduit 48. The cable 126 will be of sufficient length that when the tower has reached its full length it will raise the arm 68 to move the valve to an intermediate stage so that the apertures 80 and 82 will be intermediate the apertures 72 and 74 and 78, respectively. The lost motion device 114 will allow the actuating device 112 to remain in contact with the contact 108 but the pressure in the line 46 will build up to overcome the tension of the spring 120 so that the piston 118 will move upwardly and raise the actuating member 112 out of contact with the contact 108 and thus deenergize the motor 44. The operator will then throw the switch 102 into contact with the conductor 106 which is connected to the contact 110 of the switch 116. While the device 130 is shown as a sail responsive to wind pressure it could obviously be a thermostatic device responsive to extreme cold or other weather condition. As soon as the weather condition prevails which will operate the device 130 the cable 126 will lift the arm 68 to connect the conduit 90 to the bore 74 and the longitudinal bore 72 to the pressure supply line 46. Simultaneously the actuating member 112 will come into contact with the contact 110 and energize the motor 44 to pump the fluid into the spaces between the cylinders and to remove the fluid from the interior of the cylinders so that the tower will be collapsed under power.

In the event the tower is to be used as a radio support tower, anchor rings 132 will be supplied on each of the cylinders and guy lines 134 will be connected thereto. If desired, suitable valve mechanism, not shown, may be utilized to cause the collapse of the tower from the top to the base or from the base to the top as may be desired. Preferably if it is to be used as an antenna tower it will collapse from the top to the bottom so that the guy lines will hold the tower in firm position until it is completely closed.

It may sometimes be desirable to stop the tower in an intermediate position or to lower the tower independently of the wind responsive device 130. For this purpose a manual control line 150 is attached to the valve arm 68 and entrained over a sheave 152 and extended to a handle 154. The valve 50 and consequently the switch actuator 112 may be actuated manually to stop the tower at any desired height or actuated still further to cause lowering of the tower.

When the device is to be used for a hoist as shown in Figure 10, the guy lines will, of course, be eliminated as well as the sail device 130 and the valve 50 will be controlled manually by means of the handle 68.

Obviously, instead of the hooks 136 and 138, lifting lines (not shown) might be attached to the ends of the tower 10 so that it may be positioned in any desired location and it could be positioned between two members which are to be moved apart after which fluid would be introduced through the conduit 88 to expand the tower and apply pressure to move the items apart.

It will be apparent that the present invention provides a convenient collapsible tower and a control therefor so that the tower may be used for any purpose either to support an object from the ground or to lift or push as may be desired.

While for purpose of exemplification the presently preferred embodiment of the invention has been shown and described according to the best present understanding thereof, it will be apparent that changes and modifications may be made in the construction and arrangement of the parts thereof without departing from the true spirit and purpose of the invention.

What is claimed as new is:

1. A collapsible tower comprising telescoping cylinders constituting double acting piston means for extending or collapsing said tower, a first conduit communicating with one side of said piston, a second conduit communicating with the opposite side of said piston, a valve including a casing, a core rotatable in said casing, said core having a pair of longitudinally extending bores communicating with the end of said core, said core having a lateral bore communicating with one of said longitudinal bores, and a pair of divergent lateral bores communicating with said other longitudinal bore, said divergent bores communicating with the surface of said core in evenly spaced relation to said first-mentioned lateral bore, a pair of lateral apertures in said casing, said apertures being spaced apart for registry with said first-mentioned lateral bore and one of said divergent lateral bores, said first and second conduits being respectively connected to said lateral apertures, a source of fluid under pressure, a supply conduit connecting said source to one of said longitudinal bores, a reservoir, a return conduit connecting the other of said longitudinal bores to said reservoir, an actuating lever operatively connected to said valve, a flexible element secured to the top of said tower and to said lever, a wind receiving element secured on said flexible element and operable in response to wind pressure to actuate said valve to cause collapse of said tower.

2. In a collapsible tower having telescoping cylinders constituting double acting piston means for extending or collapsing said tower with a first conduit communicating with one side of said piston and a second conduit communicating with the opposite side of said piston, a control system comprising a valve including a casing, a core rotatable in said casing, said core having a pair of longitudinally extending bores communicating with the end of sad core, said core having a lateral bore communicating with one of said longitudinal bores, and a pair of divergent lateral bores communicating with said other longitudinal bore, said lateral bore and said divergent bores being in a common plane transverse to said core, said divergent bores communicating with a surface of said core in evenly spaced relation on opposite sides of said first-mentioned lateral bore, a pair of lateral apertures in said casing, said apertures being spaced apart for registry with said first-mentioned lateral bore and one of said divergent lateral bores, said first and second conduits being adapted to be respectively connected to said lateral apertures, a fluid storage reservoir, a pump to supply fluid from said reservoir, a supply conduit connecting said pump to one of said longitudinal bores, a return conduit connecting the other of said longitudinal bores to said reservoir, a control lever operatively connected to the core of said valve, a flexible element connected to said lever and adapted to be secured to the top of said tower, said lever being operable in one direction to connect said supply conduit to raise said tower, the raising of said tower causing said flexible element to actuate said lever to move the valve to disconnect said supply conduit from said cylinders, a wind receiving element secured on said flexible element and operable in response to wind pressure to further actuate said valve to cause collapse of said tower, an electric motor connected in driving relation to said pump, an electric switch controlling the operation of said motor, said switch being opened in response to the first-mentioned actuation of said valve, said switch being closed by said second actuation of said valve.

3. A collapsible tower comprising telescoping cylinders constituting double acting piston means for extending or collapsing said tower, a first conduit communicating with one side of said piston, a second conduit communicating with the opposite side of said piston, a valve including a casing, a core rotatable in said casing, an operating handle for said core, said core having a pair of longitudinally extending bores communicating wtih the end of said core, said core having a lateral bore communicating with one of said longitudinal bores, and a pair of divergent lateral bores communicating with said other longitudinal bore, said divergent bores communicating with the surface of said core in evenly spaced relation to said first-mentioned lateral bore, a pair of lateral apertures in said casing, said apertures being spaced apart for registry with said first-mentioned lateral bore and one of said divergent lateral bores, said first and second conduits being respectively connected to said lateral apertures, a storage reservoir, a pump connected to said reservoir, a supply conduit connecting said pump to one of said longitudinal bores, a return conduit connecting the other of said longitudinal bores to said reservoir, a flexible member secured to the top of the tower and operatively connected to said handle, said flexible element being initially actuated to move said valve to neutral position when said tower is fully extended, a wind receiving element secured on said flexible element and operable in response to wind pressure to further actuate said valve to cause collapse of said tower, a motor connected in driving relation with said pump, a control switch for said motor, a switch actuator, a lost motion connection between said handle and said actuator, said handle when in initial position preventing operation of said switch actuator, and fluid pressure means for actuating said actuator to open said switch after initial operation of said valve.

4. A collapsible tower comprising telescoping cylinders constituting double acting pistons, a reservoir, a supply conduit connected to said reservoir, a pump in said supply conduit, a return conduit connected to said reservoir, a first conduit connected to said cylinders and when connected to said supply conduit supplying fluid to raise said tower, a second conduit connected to said cylinders, and when connected to said supply conduit supplying fluid to lower said tower, a reversing valve interconnecting said conduits, a control lever for said valve, a flexible element connected between said lever and the top of said tower, said valve having a neutral position, said lever being operable to one position to connect said supply conduit to said first conduit, said flexible element being operable to move said valve to neutral position when said tower is fully raised, a wind receiving element on said flexible element, said wind receiving element being operable in response to wind pressure to move said lever to connect said supply conduit to said second conduit to lower said tower.

5. A collapsible tower comprising telescoping cylinders constituting double acting pistons, a reservoir, a supply conduit connected to said reservoir, a pump in said supply conduit, a return conduit connected to said reservoir, a first conduit connected to said cylinders and when connected to said supply conduit supplying fluid to raise said tower, a second conduit connected to said cylinders, and when connected to said supply conduit supplying fluid to lower said tower, a reversing valve interconnecting said conduits, a control lever for said valve, a flexible element connected between said lever and the top of said tower, said valve having a neutral position, said lever being operable to one position to connect said supply conduit to said first conduit, said flexible element being operable to move said valve to neutral position when said tower is fully raised, a motor connected in driving relation to said pump, a central switch for said motor, a switch lever, said switch lever underlying said control lever whereby actuation of said control lever to connect said supply conduit to said first conduit moves said switch lever to switch closing position, means urging said switch lever to open position whereby movement of said control lever to neutral position releases said switch lever to move to open position, said flexible element having wind responsive means thereon for movement of the flexible member and the lever to connect said supply conduit to said second conduit to lower said tower.

6. A collapsible tower comprising telescoping cylinders constituting double acting pistons, a reservoir, a supply conduit connected to said reservoir, a pump in said supply conduit, a return conduit connected to said reservoir, a first conduit connected to said cylinders and when connected to said supply conduit supplying fluid to raise said tower, a second conduit connected to said cylinders, and when connected to said supply conduit supplying fluid to lower said tower, a reversing valve interconnecting said conduits, a control lever for said valve, a flexible element connected between said lever and the top of said tower, said valve having a neutral position, said lever being operable to one position to connect said supply conduit to said first conduit, said flexible element being operable to move said valve to neutral position when said tower is fully raised, a motor connected in driving relation to said pump, a central switch for said motor, a switch lever, said switch lever underlying said control lever whereby actuation of said control lever to connect said supply conduit to said first conduit moves said switch lever to switch closing position, means urging said switch lever to open poition whereby movement of said control lever to neutral position releases said switch lever to move to open position, a second closing position for said switch, a lost motion connection between said control lever and said switch lever, said lost motion connection being operable to move said switch lever to its second closing position when said valve is operated to connect said supply conduit to said second conduit.

7. A collapsible tower comprising telescoping cylinders constituting double acting pistons, a reservoir, a supply conduit connected to said reservoir, a pump in said supply conduit, a return conduit connected to said reservoir, a first conduit connected to said cylinders and when connected to said supply conduit supplying fluid to raise said tower, a second conduit connected to said cylinders, and when connected to said supply conduit supplying fluid to lower said tower, a reversing valve interconnecting said conduits, a control lever for said valve, a flexible element connected between said lever and the top of said tower, said valve having a neutral position, said lever being operable to one position to connect said supply conduit to said first conduit, said flexible element being operable to move said valve to neutral position when said tower is fully raised, a motor connected in driving relation to said pump, a central switch for said motor, a switch lever, said switch lever underlying said control lever whereby actuation of said control lever to connect said supply conduit to said first conduit moves said switch lever to switch closing position, means urging said switch lever to open position whereby movement of said control lever to neutral position releases said switch lever to move to open position, a second closing position for said switch, a lost motion connection between said control lever and said switch lever, said lost motion connection being operable to move said switch lever to its second closing position when said valve is operated to connect said supply conduit to said second conduit, a lever engaging means carried by said tower and operable when said tower is fully lowered to move said control lever to neutral position and to move said switch lever away from said second closing position.

References Cited in the file of this patent
UNITED STATES PATENTS

| | | |
|---|---|---|
| 649,357 | Ridgway | May 8, 1900 |
| 840,876 | Steedman | Jan. 8, 1907 |
| 1,095,926 | Powell | May 5, 1914 |
| 1,918,426 | Radnor | July 18, 1933 |
| 2,151,057 | Suth | Mar. 21, 1939 |
| 2,308,099 | Obecny | Jan. 12, 1943 |
| 2,344,913 | Ager | Mar. 21, 1944 |
| 2,351,872 | Parker | June 20, 1944 |
| 2,517,153 | Wood | Aug. 1, 1950 |

FOREIGN PATENTS

| | | |
|---|---|---|
| 200,476 | Switzerland | Dec. 16, 1938 |
| 550,824 | Great Britain | Nov. 23, 1942 |